Feb. 9, 1960　　　　　　H. MAIER　　　　　　2,924,774
MEASUREMENT OF IMPEDANCES
Filed May 19, 1955　　　　　　　　　　　　　　　3 Sheets-Sheet 1

Inventor
H. Maier

Feb. 9, 1960   H. MAIER   2,924,774
MEASUREMENT OF IMPEDANCES
Filed May 19, 1955   3 Sheets-Sheet 2

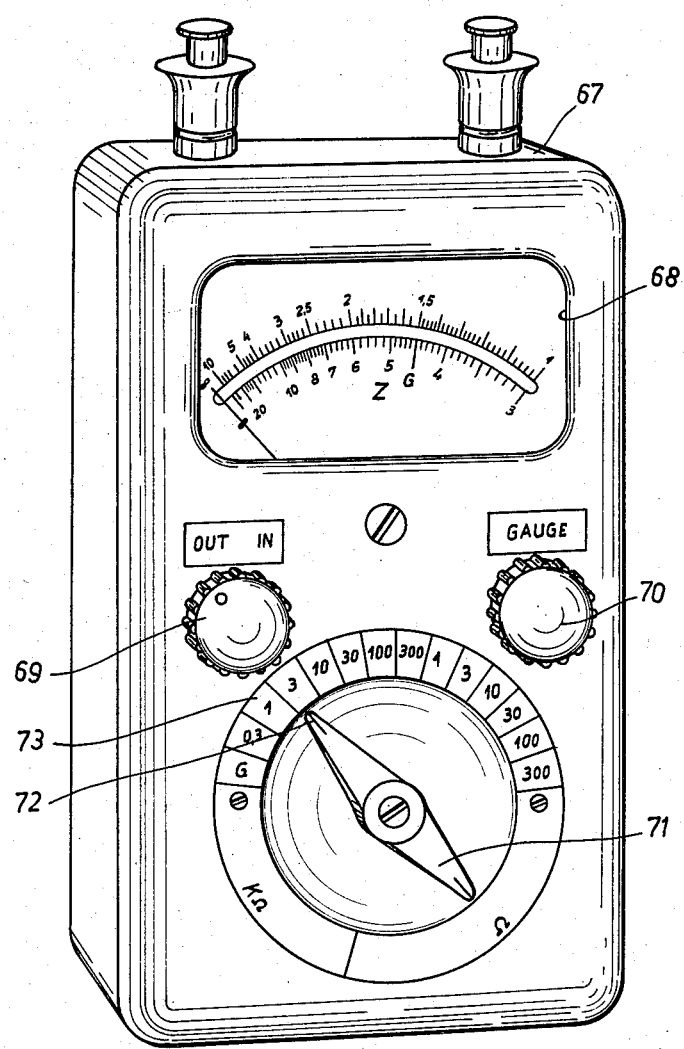

United States Patent Office

2,924,774
Patented Feb. 9, 1960

2,924,774

MEASUREMENT OF IMPEDANCES

Herbert Maier, Ebermannstadt, Oberfranken, Germany, assignor to Oskar Vierling, Ebermannstadt, Oberfranken, Germany Application May 19, 1955, Serial No. 509,584

Claims priority, application Germany August 9, 1954

4 Claims. (Cl. 324—57)

This invention relates to apparatus for the measurement of alternating current resistances, viz. impedances, in which the resistance the impedance of which has to be measured is connected to an alternating current voltage and the current flowing through the resistance is measured. The imedance to be ascertained is the quotient between the voltage at the terminals of the impedance to be measured and the current flowing through this impedance.

If the voltage at the terminals of the resistance to be measured is kept substantially constant independently of the kind of the resistance, the measuring of the voltage may be dispensed with and calibrate directly in ohms an ammeter through which the current flowing through the impedance is measured.

In order to maintain the voltage at the terminals of the resistance to be measured constant, it is however generally necessary, to use special automatically operating regulating devices, so that the devices of the above kind as hitherto known are comparatively large and expensive.

The object of the invention is to provide an apparatus for measuring impedances which is very simple, by dispensing with separate voltage regulations, and which is light and of small dimensions, and which comprises an ammeter, the scale of which is calibrated directly in ohms.

Another object of the invention is to provide an impedance meter which is fed by a battery and which consumes very little current and can be used at any point as a hand measuring device, independently of a heavy current supply.

A still further object of the invention is to so construct a small, light and simple impedance meter that, by changing over the measuring range, it is possible to measure impedances the values of which lie between 0.3 ohm and about 1000 kilo ohms.

The invention is based on the fundamental idea that the measurement of the resistance of any desired impedance by means of an ammeter calibrated directly in ohms requires the use of a source of voltage of alternating current which, independently of the kind of the impedance to be measured, produces at the terminals of the latter a substantially constant voltage corresponding to the particular measuring range.

The invention consists in that an impedance meter of the kind above described is provided with a source of alternating current the internal resistance of which is so small that it is inapplicable compared with the resistance of the impedance to be measured, so that also great differences in the phases of the voltage component of the internal resistance of the source of alternating current and of the resistance to be measured can be neglected.

It has been found that an oscillator using transistors fulfils this requirement to a great extent, so that it is possible to construct a measuring device of the kind above referred to provided with a transistor oscillator acting as a source of alternating current, the limits of error of which, mainly caused by the kind of the impedance to be measured, are smaller than about 3%; such exactness of the indication is fully adequate for ordinary measurements.

Further objects and features of the invention are hereinafter referred to in connection with a few examples hereinafter described with reference to the acompanying drawings, which are essentially diagrams of impedance meters according to the invention, it being understood that the invention is not limited thereto.

Figure 6 is a plan view of an impedance measuring device according to the invention.

Figure 1:
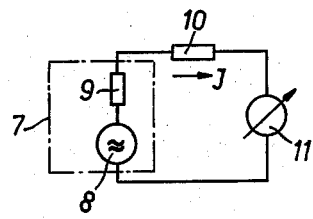
Figure 1 is the fundamental diagram of connections for the measurement of an impedance, which is not an arrangement according to the invention, but simply illustrates the principle on which the invention is based.

Referring to the diagram shown in Figure 1, the E.M.F. produced by the source of alternating current 7, indicated at 8 by the usual alternating current symbol, sends an alternating current J through the internal impedance 9 of the source of current 7, through the resistance 10 to be measured, and the ammeter 11. If the E.M.F. of the source of alternating current 7 is constant, the value of the current flowing through the circuit is dependent not only upon the value of the resistance 10, but is also influenced by the internal impedance of the source of alternating current and the impedance of the ammeter.

The ammeter 11 may mostly be so constructed as to have a very low internal resistance, so that its impedance can be disregarded.

The internal impedance 9 of the source of alternating current 7 plays an important part, if capacitive as well as inductive resistances have to be measured with the same adjustment of the apparatus. This is made quite clear by the vector diagram shown in Figure 2.

The current J flowing through the measuring circuit shown in Figure 1 produces in the impedance of the source of alternating current 7 a voltage drop 12 which, when the inner impedance 9 of the source of alternating current 7 is very inductive, leads with respect to the current J. The total E.M.F. of the source of alternating current 7 may be constant, so that the end of the vector representing it will always remain on the circle 13. If the impedance 10 which is inserted into the circuit is also very inductive, the voltage at its terminals will be 14, which, as a vector, will lie somewhat in the extension of the voltage vector 12. On the other hand, if the impedance 10 is purely capacitive, then a voltage at its terminals will be 15, lagging by 90° behind the current J.

Figure 2:
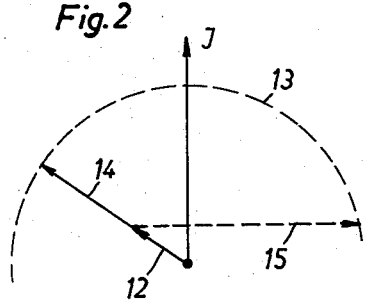
Figure 2 is a diagram of the voltages in the measuring circuit shown in Figure 1.

The diagram of Figure 2 shows quite clearly that when the current J and the E.M.F. of the source of alternating current 7 are constant, in the case of the inductive resistance there is only a small voltage 14 at the terminals of this resistance, whilst in the case of a capacitive resistance, the voltage 15 at the terminals of the resistance is high. In both cases, the ammeter 11 shows the same deflection; that is to say, it shows the same value of the resistance, whilst the actual impedances of the components to be measured, and which are given by the quotients between voltage and current, are actually very different from one another.

According to the invention, the voltage drop in the source of alternating current 7 has to be made so small by a suitable construction thereof, and without using additional regulating devices, that it can be disregarded as compared with the voltage drops in 14, 15 in the resistances to be measured.

Such a source of alternating current with comparatively very small internal resistance is a transistor oscillator.

The invention consists more particularly in that a transistor is used as a source of alternating current for measuring impedances, which transistor is so self-excitedly coupled with an oscillatory circuit that the internal resistance of the transistor-circuit, from which the measuring voltage is to be obtained, is very small.

It is known, for instance, that a circuit including the emitter and the base of a transistor of the point contact type has a very small resistance. The same applies in the case of a transistor of the junction type also to the resistance in the emitter-collector circuit.

Figure 3:
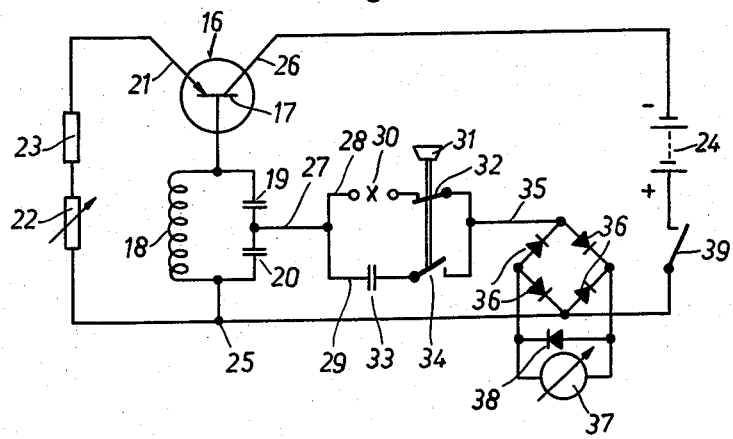
Figure 3 is a diagram of connections of a simple impedance measuring device according to the invention.

The diagram of connections shown in Figure 3 illustrates a transistor 16 of the point contact type, the base 17 of which is connected with an oscillatory circuit consisting of the inductance 18 and the two capacitors 19 and 20 connected in parallel with the inductance 18. The circuit of the emitter 21 comprises an adjustable resistance 22 and a fixed current-limiting resistance 23. A battery 24, the positive pole of which is connected at 25 to the oscillatory circuit, consisting of the inductance 18 and the condensers 19 and 20 and to the free end of the adjustable resistance 22, produces the negative bias for the collector 26.

The conductor 27 of the measuring circuit is connected at a point between the two condensers 19, 20 of the oscillatory circuit, and divides into two branches 28 and 29. The connection of the conductor 27 at a point between the two series-connected condensers locks the circuit comprising the resistances to be measured with respect to direct current, so that resistances to which a direct current voltage is applied can also be measured. The resistance 30 to be measured lies in the branch 28 in series with a single-pole switch 32 operated by a push-button 31. In the branch 29 there is inserted a fixed resistance 33, represented by a capacity, in series with a switch 34, also operated by the push-button 31. The two switches 32 and 34 are so connected with the push-button 31, that when the latter is pressed down against the action of a spring, which is not shown, the switch 34 is closed and the switch 32 is opened, whilst when the push-button is released, the switch 34 is opened and the switch 32 is closed. The two branches 28 and 29 are connected together behind the switches 32 and 34 to a conductor 35, in which four Grätz-connected rectifiers 36 are inserted, the same converting the alternating current flowing through the conductor 35 into direct current, and passing it to the ammeter 37 connected to them. A single-phase rectifier 38, the purpose of which is hereinafter described, is connected in parallel with the ammeter 37.

As can be seen from the drawing, the circuit of the transistor 16 (with the oscillatory circuit 18, 19, 20 in its base circuit and the resistances 22 and 23 in the emitter circuit) is one of self-excitation, so that when the battery 24 is inserted by means of the switch 39, the oscillatory circuit 18, 19, 20 is excited with its own frequency. The current flowing in the oscillatory circuit and the voltage arising in the conductor 27 may be adjusted by a suitable setting of the adjustable resistance 22.

When the apparatus has to be operated, first of all, the push-button 31 is pressed down, whereby the fixed resistance (condenser 33) is inserted into the measuring circuit. By adjusting the resistance 22 the current flowing through the condenser 33 is so regulated, that the ammeter 37 is deflected up to a definite calibrated mark. If the push-button is now released, the condenser 33 is disconnected from the measuring circuit, and, instead thereof, the resistance 33 to be measured is inserted into the measuring circuit. The deflection which is now obtained in the ammeter 37, which is provided with a scale calibrated in ohms now shows directly the value of the impedance of the resistance 30 to be measured.

The ohmic scale of the direct current ammeter 37, which has a small internal resistance, had to be graduated hyperbolically. In order to obtain a more uniform division of the instrument so as to facilitate the reading, a one way rectifier 38 is connected in parallel with the terminals of the ammeter 37.

As already pointed out above, the resistance of the emitter-base circuit of the transistor-oscillatory circuit is small; if the oscillatory circuit 18, 19, 20, itself is so constructed that it has no loss, as a rectifier 36 preferably as germanium-junction diodes, which as is well known have a small resistance in the one direction, and also the resistance of the ammeter 37 is made as small as possible, the position of the phases of these resistances is of no importance as regards the measurement, so that the absolute value of the impedance of the resistance 30 can be ascertained very accurately and independently of the fact whether this resistance is inductive, ohmic or capacitive.

Figure 4:
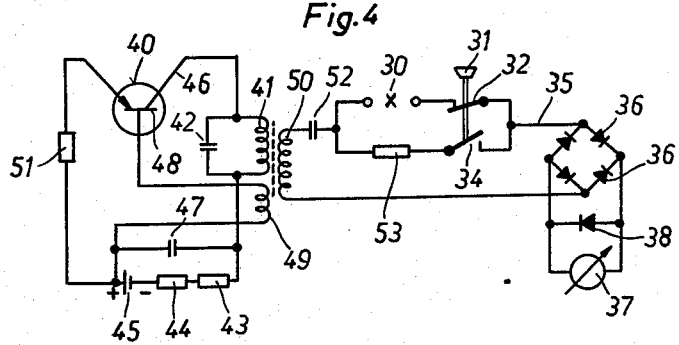
Figure 4 is a modified diagram of connections of a simple impedance measuring device.

The arrangement shown in Figure 4 of a modified measuring apparatus operates according to the same fundamental principle as the apparatus shown in Figure 3, but with a transistor of the junction type 40 and the oscillatory circuit consisting of the inductance 41 and the capacitor 42, which oscillatory circuit is connected in series with the regulating resistance 43, the adjustable resistance 44 and the battery 45 in the circuit of the collector 46. The resistances 43, 44 and the battery 45 are thereby bridged over by the capacitor 47. An excitation winding 49 is inserted in the connection between the base 48 and the positive pole of the battery 45, which excitation winding 49 is wound, together with the inductance 41 of the oscillatory circuit, and the coil 50 which takes up the useful voltage, on a common iron core which has no loss. The emitter circuit includes the resistance 51, which serves for the adjustment of a suitable emitter voltage bias.

The connections of the other parts of the measuring circuit, which is connected to the coil 50 through the capacitor 52, in order to stop the passage of a direct current through the measuring circuit, do not differ from the connections of the measuring circuit shown in Figure 3, except that, instead of the capacitor 33 representing the fixed resistance, an impedance 53 principally of ohmic resistance and serving as a calibrating resistance is now used, which impedance, in view of the vector position of the internal resistance of the oscillator, is so chosen, that the negative indicated error in the case of a purely capacitive, and the positive error in the case of very inductive resistance, are always approximately equal.

As can easily be seen, an apparatus according to the arrangement shown in Figure 4 operates in exactly the same way as an apparatus according to the arrangement shown in Figure 3, so that it is not necessary to describe it in detail.

Figure 5:
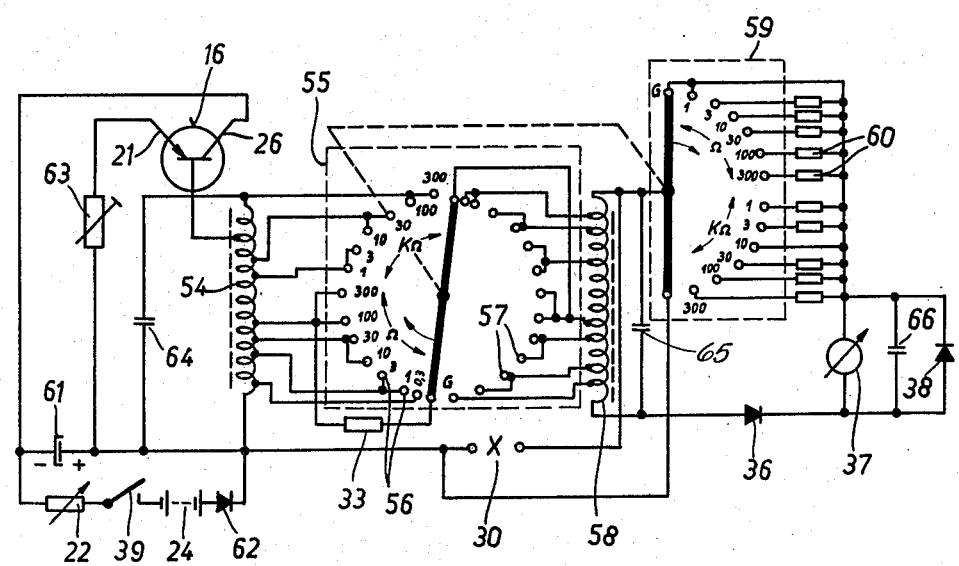
Figure 5 is a diagram of connections of an impedance measuring device, the measuring range of which can be changed in steps from fractions of 1 ohm up to 300 kilo ohms.

Figure 5 illustrates a diagram of connections of an impedance measuring apparatus suitable for industrial as well as for laboratory purposes, which apparatus is constructed exactly in the same way as shown in Figure 3, as regards the voltage generating part. However, the difference lies therein that the inductance of the oscillatory circuit indicated by 18 in Figure 3 is constituted by a coil 54 wound on an iron core in the form of a tapped transformer the tappings of which lead to the contacts 56 of a switch 55 changing the measuring ranges. The contacts 56 connected to the tappings of the inductance 54 lie on the one side of a semi-circle, and opposite thereto lie further contacts 57 which are connected to tappings provided on an auto-transformer 58. The measuring circuit containing the measuring instrument 37 is connected to the said auto-transformer. The measuring circuit includes a further switch 59, which is connected with the switch 55 of the measuring range and, according to the position of a switching arm, inserts one of the balancing resistances 60 into the circuit of the measuring instrument 37.

Further deviations from the construction shown in Figure 3 consists in the provision of an electrolytic condenser 61 between the emitter 21 and the collector 26, as well as of a protecting diode 62 connected in series with the battery and the purpose of which is to protect the sensitive transistor part of the apparatus against the effects of an inadvertent connection of the battery 24 with the wrong polarity. In the case of this arrangement, the adjustable resistance 22 lies directly in series with the battery 24 and the disconnecting switch 39, whilst the emitter circuit 21 includes only a fixed adjustable resistance 63. The two capacitors 19 and 20 (see Figure 3) are united into a single capacitor 64. The capacitor 65, connected in parallel with the auto-transformer 58, is tuned with the inductance of the auto-transformer to be in resonance with the measuring frequency; in this way, the number of turns of the auto-transformer can be reduced, so that the same can be made very small. The arrangement further comprises a rectifier 36 which rectifies in one direction the current flowing through the measuring instrument 37; a condenser 66 connected in parallel with the instrument 37 damps the pulsations of the current flowing through the instrument that are thereby produced.

The other components which have not been specifically mentioned are provided with the same reference numerals as the corresponding parts in Figure 3.

The apparatus, the diagram of which is shown in Figure 5, operates as follows:

First of all the measuring range switch 55 is brought into the position indicated by G, in which the measuring circuit, which is closed over the comparison resistance 33, is to be calibrated. Thereupon, the switch 39 is closed, whereby the transistor 16 starts to oscillate and generates an alternating current voltage in the induction coil 54. By regulating the resistance 22, shown on the left lower part, the hand of the ammeter 37 is adjusted to a point of the scale, which is marked as a calibrated point, as will be hereinafter described with reference to Figure 6. In order to insert the resistance 30 to be measured (the connecting terminals of which are represented underneath the measuring range switch 55) into the measuring circuit, the said switch 55 is turned clockwise, whereby the measuring range is increased in steps from 0.3 to 1, then to 3, to 10 and to 30 ohms, etc. until it is increased up to the maximum value of 300 kilo ohms. For a definite position, a deflection of the instrument 37 is then obtained, which can readily be read and which, by taking into consideration the transformation factor shown by the position of the measuring range switch, gives the wanted impedance of the measuring component 30.

As can be seen from this short description the operation of the apparatus is exceedingly simple; it can be carried out by entirely unskillful persons.

Figure 6 will now be referred to before further details of the construction shown in Figure 5 are described.

The apparatus shown in perspective view has the following dimensions: length 170 mm., width 110 mm., height 70 mm. The upper end surface 67 of the apparatus is provided with two insulated connectors, to which the resistance 30 to be measured can be suitably connected. The upper part of the apparatus accommodates mainly the measuring instrument 37, which is constructed as a highly sensitive moving coil instrument, and is provided with two graduations, of which the upper one is intended for the decadic measuring ranges, and the lower one for the intermediate measuring ranges connected with the factor 3. On the left-hand side underneath the glass window 68 covering the scale of the instrument, there is provided a switching knob 69, which operates the switch 39 of the arrangement shown in Figure 5. On the right-hand side underneath the scale of the instrument, there is provided a knob 70 for the regulation of the resistance 22, which enables the voltage of the transistor-oscillator to be adjusted. In the middle, at the lower end of the apparatus is provided the measuring range switch 55, the arm 71 of which is provided with an indication 72, which can be set over the graduation 73 to correspond to any desired measuring range of the apparatus.

As can be seen from Figure 6, the apparatus is small and can be easily handled; all the operating parts lie in front of the apparatus so that possibility of making a mistake is greatly avoided.

In addition to the light weight and the small dimensions of the apparatus, the following advantages have also to be mentioned as regards the diagram of connections shown in Figure 5.

The oscillatory circuit 54, 64 of the transistor-oscillator lies in the emitter-base circuit of very small resistance of the transistor. The electrolytic condenser 61 provides a strong coupling of very small losses with the source of current (battery 24). The oscillatory circuit itself consists of a capacitor 64 without loss, and of a coil 54 also of very small loss with a ferrite core, the resistance of which is comparatively small. The auto-transformer 58 is likewise free of losses; the same holds good for the measuring instrument 37.

More particularly the small internal resistance of the transistor 16 coupled with the oscillatory circuit 54, 64 enables the internal voltage drop of the whole of the apparatus to be reduced to a value ensuring an indication accuracy of 2 to 3%, entirely independent of whether a capacitive or an inductive resistance has to be measured. As can easily be seen from Figure 5, the switching of the measuring ranges is effected by intermittently switching on to the tappings of the coil 54 and of the auto-transformer 58. Thereby, only full turns of the coil can be connected up or disconnected, so that the ratios of voltage transmission do not always correspond exactly to the desired scale factor 10 or 3. Therefore, the very small correction resistances 60 are provided for the individual measuring ranges; they can be inserted into the circuit of the measuring instrument 37 by the switch 58 mechanically connected directly with the selecting switch 55 of the measuring ranges. By means of the resistances 60 it is possible to adjust also the stray differences which depend upon the ratio of transmission and the position of the individual tappings of the coil 54 and of the auto-transformer 58.

An essential feature of the new apparatus lies in that the currents used for the measurement are exceedingly small, so that also the iron core coils (induction coil 54 and auto-transformer 58) can hardly be de-tuned by the weak current flowing through them. Thus, the adjustment of the oscillatory circuit can be fixed. A subsequent regulation is not necessary. For the measurement use is made of a fixed reference frequency, for instance 800 cycles. However, it can easily be seen that it is also possible to effect a change in the frequency without great difficulty, if a further capacitor is for instance connected in series or parallel, with the capacitor of the oscillatory circuit.

The internal resistances of the circuit of the measuring instrument 37 can be kept small by this that the rectifier 36 and, if desired, also the rectifier 38 is constructed as germanium-diodes of the junction type which offer a very low resistance to the passage of the current. As regards the battery required for the apparatus diagrammatically shown in Figure 5 and, as regards its appearance, in Figure 6, use is made of a normal battery for deaf-aid apparatus having a voltage of about 22 volts which, since it consumes very little current, has a very long life.

What is claimed is:

1. An electric measuring device for the measurement of impedances comprising a transistor, a battery connected to said transistor, an oscillatory circuit of low loss connected to the base of the transistor and determining the frequency of the transistor connected as an oscillator, an inductance and a capacitor connected in parallel in said oscillatory circuit, a measuring circuit connected to the oscillatory circuit of the transistor-oscillator and supplied with alternating current therefrom, connecting means in the measuring circuit for the selective insertion of a standard impedance of known value fixed in the apparatus, and of a resistance to be measured external to the apparatus, a D.C. measuring device having a low resistance connected to the measuring circuit for the selective indication of the current flowing through the standard impedance or the resistance to be measured through a germanium junction type rectifier having low resistance in the direction of the passage of current, a casing to hold the components and conductors connecting between the said components, the said inductance of the oscillatory circuit comprising a coil without loss having a ferromagnetic core and provided with tappings and an auto-transformer with tappings, the said measuring device connected through rectifiers in parallel to the entire transformer winding, a measuring-range switch in the measuring circuit to connect the tappings of the auto-transformer in step with the tappings of the inductance for stepwise increase of voltage applied to the terminals of the resistance to be measured.

2. An electrical measuring arrangement for the measurement of impedances as set forth in claim 1, in which an additional switch mechanically connected with the measuring range switch in dependence upon the position of the range switch inserts compensating resistances in the circuit of the D.C. measuring instrument, the compensating resistances acting to adapt the voltages of the parts of the inductance of the oscillatory circuit and of the auto-transformer to the different measuring ranges of the apparatus.

3. A device for the measurement of impedances comprising in combination an oscillator circuit consisting of a transistor connected to a condenser and an iron core inductor, a series of taps on said inductor, an auto-transformer having taps leading therefrom, a measuring device a rotary switch adapted to interconnect between respective inductor tap and auto-transformer tap, conductors including a conductor movable with the rotary switch for connecting an unknown impedance in series with the measuring device across the output of the auto-transformer, and a standard impedance connected at one end to one inductor tap and at the other end to a contact of the rotary switch to permit calibration of the measuring device by positioning the rotary switch to connect the contact to a predetermined auto-transformer tap and a further conductor connected between one end of the unknown impedance and a contact engageable by the movable conductor for short-circuiting said unknown impedance upon connection of the standard impedance to the predetermined tap of the auto-transformer.

4. The invention as set forth in claim 3, in which said movable conductor is the wiper arm of a second rotary switch mechanically connected for motion with the said first-mentioned switch, a plurality of resistances each connected at one end to a respective contact of the second switch and commonly connected at the other ends to one terminal of the said measuring device, the wiper arm being connected to one output terminal of the auto-transformer, the other terminal of the measuring device being connected to the other output terminal of the auto-transformer.

References Cited in the file of this patent
UNITED STATES PATENTS 2,377,275    Smith _____ May 29, 1945

OTHER REFERENCES

III "Transistor Audio Source," Electronics, Dec. 1954, p. 182.

Lehan: "Electronics," Aug., 1949, pp. 90, 91.

Graham. "Radio & Television News," Oct. 1953, pp. 84, 85, 162, 164.

Kretzmer: "Bell Telephone System Technical Publications Monograph 2239," pp. 1–11, July 1954, published in "Proceedings of the Institute of Radio Engineers," vol. 42, pp. 391–401, February 1954.